United States Patent  (10) Patent No.: US 8,966,463 B2
Sathyanathan et al.  (45) Date of Patent: Feb. 24, 2015

(54) ELIMINATING REDUNDANT FUNCTION CALLS

(75) Inventors: Patrick W. Sathyanathan, Bellevue, WA (US); Ten Tzen, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 340 days.

(21) Appl. No.: 13/306,055

(22) Filed: Nov. 29, 2011

(65) Prior Publication Data

US 2013/0139136 A1  May 30, 2013

(51) Int. Cl.
G06F 9/44 (2006.01)

(52) U.S. Cl.
USPC ......................................................... 717/157

(58) Field of Classification Search
USPC ......................................................... 717/157
See application file for complete search history.

(56) References Cited

U.S. PATENT DOCUMENTS

| | | | |
|---|---|---|---|
| 5,828,883 A | 10/1998 | Hall | |
| 6,145,124 A * | 11/2000 | Price | 717/153 |
| 6,289,507 B1 * | 9/2001 | Tanaka et al. | 717/155 |
| 7,069,555 B1 | 6/2006 | Tzen | |
| 7,363,621 B2 * | 4/2008 | Takeuchi | 717/157 |
| 7,721,269 B2 | 5/2010 | Cates | |
| 8,495,606 B2 * | 7/2013 | Lobo et al. | 717/157 |
| 2004/0025165 A1 * | 2/2004 | Desoli et al. | 719/310 |
| 2004/0205739 A1 * | 10/2004 | Haber et al. | 717/151 |
| 2010/0107144 A1 | 4/2010 | Alkins et al. | |
| 2010/0281471 A1 * | 11/2010 | Liao et al. | 717/150 |

OTHER PUBLICATIONS

Rustandi et al., "Eliminating Redundant Function Calls", Fall 2003, CMU.*
Ierusalimschy, "Programming in Lua 17:1", Dec. 2003, Lua.org.*
VanDrunen et al. "Anticipation-based partial redundancy elimination for static single assignment form", Sep. 2002, SP&E.*
VanDrunen, "Partial Redundancy Elimination for Global Value Numbering", Aug. 2004, Purdue University.*
Horspool et al., "Partial Redundancy Elimination Driven by a Cost-Benefit Analysis", 1997, University of Victoria.*
Paleri et al., "A Simple Algorithm for Partial Redundancy Elimination", 1998, ACM.*
Bodik et al., "Complete Removal of Redundant Expressions", 1998, ACM.*
Gupta et al., "Register Pressure Sensitive Redundancy Elimination", 1999, Springer-Verlag Berlin Heidelberg, pp. 107-122.*
Pop, Sebastian, "Interface and Extension of the Open Research Compiler", Retrieved at <<http://www.cri.ensmp.fr/people/pop/papers/2002-09-orc.ps>>, Technical report, INRIA, Sep. 5, 2002, pp. 1-41.

(Continued)

*Primary Examiner* — Anna Deng
*Assistant Examiner* — Junchun Wu

(57) ABSTRACT

A computer-implemented method for removing redundant function calls in a computer program includes identifying a first set of equivalent function calls appearing in the computer program. For each of the equivalent function calls, the method identifies whether the function call is partially available or partially anticipable. When a function call is identified as being partially anticipable, a result of the function call is stored in a temporary variable. When a function call is identified as being partially available, the function call is removed and replaced with use of the temporary variable.

18 Claims, 4 Drawing Sheets

(56) References Cited

OTHER PUBLICATIONS

Agrawal, Gagan, "Interprocedural Partial Redundancy Elimination with Application to Distributed Memory Compilation", Retrieved at <<http://ieeexplore.ieee.org/stamp/stamp.jsp?tp=&arnumber=707537>>, IEEE Transactions on Parallel and Distributed Systems, vol. 9, No. 7, Jul. 1998, pp. 609-625.

Xue, et al., "A Fresh Look at Partial Redundancy Elimination as a Maximum Flow Problem (Abstract)", Retrieved at <<http://citeseerx.ist.psu.edu/viewdoc/download?doi=10.1.1.91.2333&rep=rep1&type=pdf>>, International Conference on Compiler Construction, Mar. 30-31, 2006, pp. 2.

Rustandi, et al., "Eliminating Redundant Function Calls", Retrieved at <<http://www.cs.cmu.edu/~jsstylos/15745/final.pdf>>, 2003, pp. 7.

Hall, et al., "Interprocedural Compilation of Fortran D (extended version)", Retrieved at <<http://www.cs.umd.edu/projects/cosmic/papers/jpdc96.ps>>, Jun. 1996, pp. 32.

Bacon, David Francis, 1997, "Fast and Effective Optimization of Statically Type Object-Oriented Languages", Berkeley, CA : UC Berkeley, 1997, 155 pgs.

\* cited by examiner

ELIMINATING REDUNDANT FUNCTION CALLS

BACKGROUND

Complex software applications typically include hundreds or even thousands of subroutines or functions. Each of the subroutines typically performs a particular function or set of functions. The subroutines of the software application communicate with one another by calling one another in a variety of distinct calling paths. A call path is a communication path between two or more subroutines. Oftentimes, applications can include redundant function calls.

When a redundant or duplicate function call occurs in a running program, a task is performed that was performed previously by the first function call. Frequently, it happens that each of the duplicate calls is unnecessary, because the task only needed to be performed one time. One reason that a duplicate call is unnecessary is that the called function is "pure" and is called more than once with the same input arguments. A function is said to be "pure" if the result computed by and returned by it, either as a return value or through an out parameter, is dependent solely on the input arguments, and further the function does not change any global state. Moreover, redundant function calls uselessly add to the expense of a method, such as by increasing time requirements and/or by consuming memory and CPU capacity.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

In translating user written source code to an intermediate language file, the compiler front-end in several situations may need to call the component object model (COM) QueryInterface method, even though the source code does not have these calls. The front-end may not call the QueryInterface method directly, but instead may automatically inject calls to helper methods. Since the front-end generates these helper calls on an expression-by-expression basis, there will likely be many redundancies. One embodiment is directed to an optimization at the back-end that identifies and removes such redundant calls both intra-procedurally and inter-procedurally.

One embodiment is directed to a computer-implemented method for removing redundant function calls in a computer program. The method includes identifying a first set of equivalent function calls appearing in the computer program. For each of the equivalent function calls, the method identifies whether the function call is partially available or partially anticipable. When a function call is identified as being partially anticipable, a result of the function call is stored in a temporary variable. When a function call is identified as being partially available, the function call is removed and replaced with use of the temporary variable.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that features of the various exemplary embodiments described herein may be combined with each other, unless specifically noted otherwise.

Figure 1:
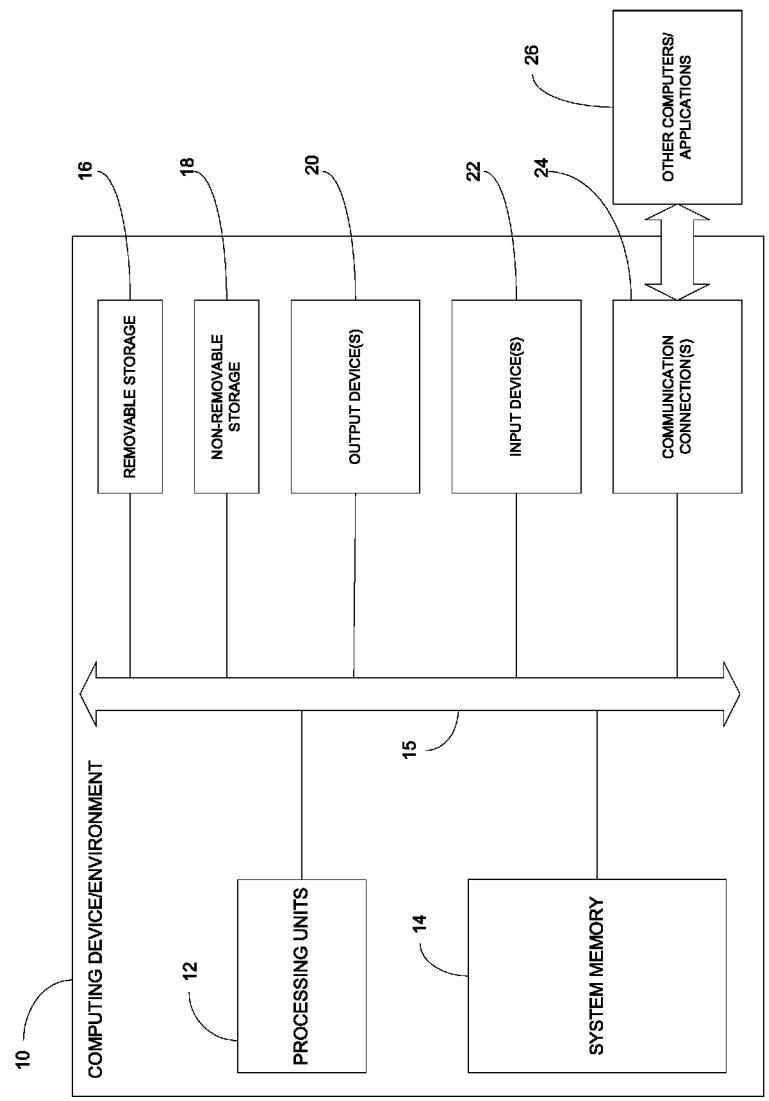
FIG. 1 is a block diagram illustrating a computing environment suitable for implementing aspects of a system for eliminating redundant calls according to one embodiment.

FIG. 1 is a diagram illustrating a computing environment 10 suitable for implementing aspects of a system for eliminating redundant calls according to one embodiment. In the illustrated embodiment, the computing system or computing device 10 includes one or more processing units 12 and system memory 14. Depending on the exact configuration and type of computing device, memory 14 may be volatile (such as RAM), non-volatile (such as ROM, flash memory, etc.), or some combination of the two.

Computing device 10 may also have additional features/functionality. For example, computing device 10 may also include additional storage (removable and/or non-removable) including, but not limited to, magnetic or optical disks or tape. Such additional storage is illustrated in FIG. 1 by removable storage 16 and non-removable storage 18. Computer storage media includes volatile and nonvolatile, removable and non-removable media implemented in any suitable method or technology for non-transitory storage of information such as computer readable instructions, data structures, program modules or other data. Memory 14, removable storage 16 and non-removable storage 18 are all examples of computer storage media (e.g., computer-readable storage media storing computer-executable instructions that when executed by at least one processor cause the at least one processor to perform a method). Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by computing device 10. Any such non-transitory computer storage media may be part of computing device 10.

The various elements of computing device 10 are communicatively coupled together via one or more communication links 15. Computing device 10 also includes one or more communication connections 24 that allow computing device 10 to communicate with other computers/applications 26. Computing device 10 may also include input device(s) 22, such as keyboard, pointing device (e.g., mouse), pen, voice input device, touch input device, etc. Computing device 10 may also include output device(s) 20, such as a display, speakers, printer, etc.

FIG. 1 and the above discussion are intended to provide a brief general description of a suitable computing environment in which one or more embodiments may be implemented. It should be understood, however, that handheld, portable, and other computing devices of all kinds are contemplated for use. FIG. 1 thus illustrates an example of a suitable computing system environment 10 in which the embodiments may be implemented, although as made clear above, the computing system environment 10 is only one example of a suitable computing environment and is not intended to suggest any limitation as to the scope of use or functionality of the embodiments. Neither should the computing environment 10 be interpreted as having any dependency or requirement relating to any one or combination of components illustrated in the exemplary operating environment 10.

Figure 2:
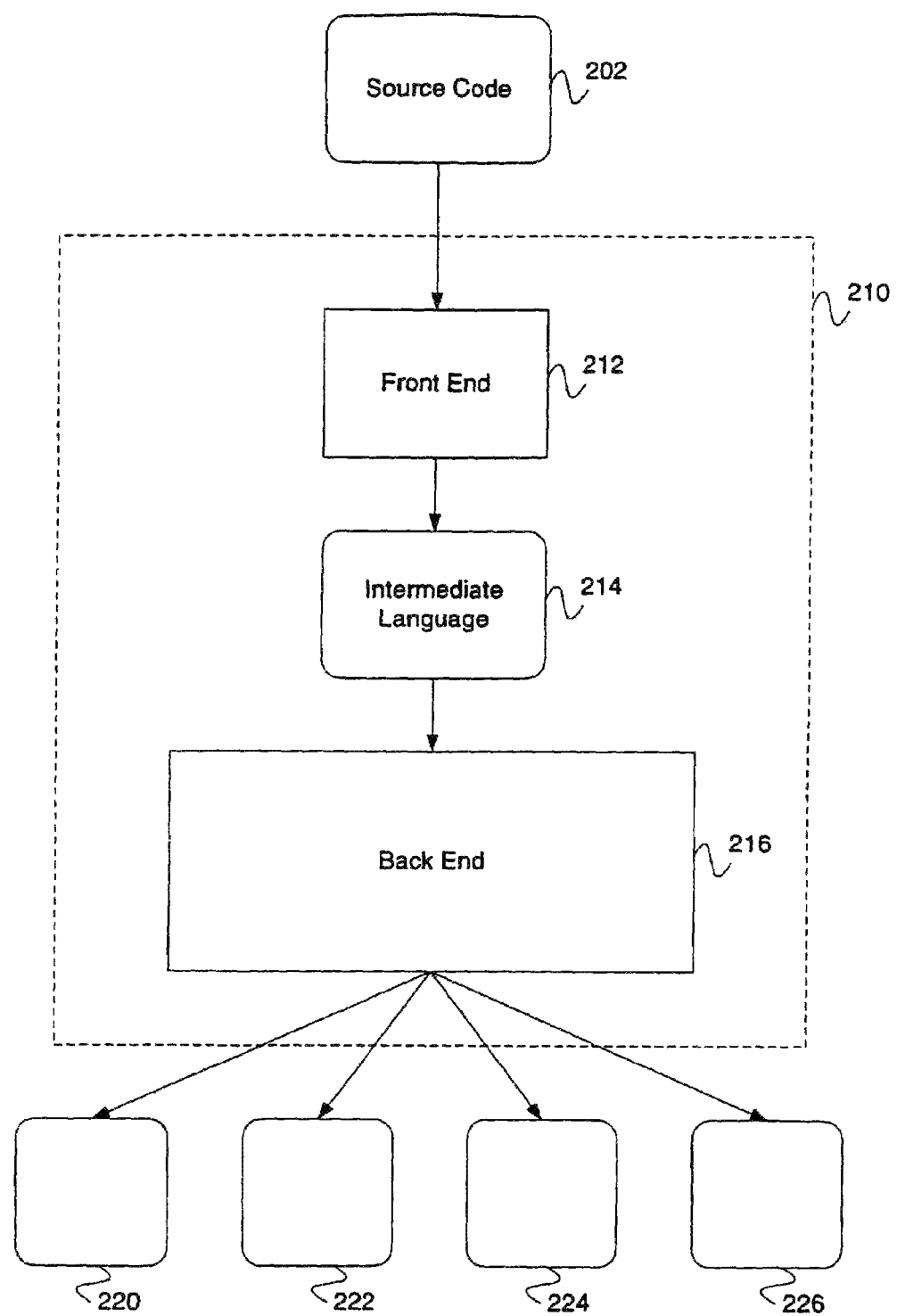
FIG. 2 is a diagram illustrating a system-level overview of a system for eliminating redundant calls according to one embodiment.

FIG. 2 is a diagram illustrating a system-level overview of a system for eliminating redundant calls according to one embodiment. The exemplary operating environment includes a language compiler 210, which in one embodiment includes a front-end module 212 and a back-end module 216. Compiler 210 can be a stand-alone compiler, or it can be part of an integrated development environment. Front-end module 212 receives as input a source code file 202. Source code file 202 is a file containing statements and expressions in a particular programming language. In one embodiment, the programming language is the C++ programming language. In an alternative embodiment, the programming language is the C programming language. Embodiments are not limited to any particular programming language. For example, source code file 202 can be in the Java, Ada, Pascal or other programming languages known in the art.

In some embodiments, front-end module 212 reads the source code file 202, performs syntax checking, and parses the statements and expressions. In some embodiments, source code file 212 is parsed by front-end module 212 into an intermediate language file 214. Intermediate language file 214 comprises a generic assembly-like language translation of the parsed source code file 202. Back-end module 216 receives as input the intermediate language file 214, and produces one or more object code files 220-226 for a particular processor and operating system. Back-end module 216 thus converts the generic assembly language statements in intermediate language file 214 to processor specific assembly language and object code. In addition, back-end module 216 performs various optimizations designed to increase the performance of the executable code in object code files 220-226. In one embodiment, the optimizations include analyzing the code and eliminating redundant calls. Details on the method used to perform these optimizations are described in further detail below.

As indicated by the dashed lines for compiler 210, front-end module 212 and back-end module 216 can be modules of the same program, they can be separate programs that are part of a package, or they can be separate programs that reside on different computing systems. In one example of the latter environment, the front-end module 212 receives and processes the source code 202 on one system to produce the intermediate language file 214, which can then be distributed to other systems for processing by back-end module 216. Embodiments are not limited to any particular system distribution model for front-end 212 and back-end 216.

In translating the user written source code 202 to intermediate language 214, the front-end 212 in several situations may add calls to the component object model (COM) QueryInterface method, even though the source code 202 does not have these calls. In one embodiment, the front-end 212 does not call the QueryInterface method directly, but instead uses some helper methods. In one embodiment, the compiler front-end 212 injects calls to several helper functions into the intermediate language code 214. A reason it does so is to make the user code 202 as simple as possible and hide complex implementation details. Since the front-end 212 generates these helper calls on an expression-by-expression basis, there will likely be many redundancies. Thus, this approach has the disadvantage that the final code generated by the compiler 210 may be inefficient, and is worse in terms of performance than code that would be written by the user had the user programmed at the lower level of abstraction. One such class of helper functions are used when there is casting between different interface types and between object types that implement interfaces. Since the compiler front-end 212 generates calls to these cast helper functions on a statement-by-statement basis, many of the function calls are redundant and a considerable runtime penalty may be incurred if unnecessary calls are not eliminated. One embodiment is directed to an optimization at the back-end 216 that identifies and removes redundant calls both intra-procedurally and inter-procedurally.

In COM, the QueryInterface method is used to query an object about the interfaces that it supports. The QueryInterface method takes two parameters, the first "in" parameter being a global unique identifier (GUID) that specifies the Interface ID (IID) that is being queried, and the second "out" parameter is a pointer through which the actual interface pointer is returned if it exists. If the object supports an interface that matches the GUID, the object gives back a pointer that can be cast into a pointer to the correct type of interface. As with all COM methods, an HRESULT return value specifies success or the error code on failure.

One of the helper functions that may be added to the intermediate language code 214 by the front end 212 is a winrt_ptr_cast function, which is a wrapper for the QueryInterface method. A call to the winrt_ptr_cast helper function is considered as an "expression", with the "from" ref pointer type and the "to" ref pointer type as arguments. The optimization to eliminate redundant calls to the winrt_ptr_cast function may be implemented in a couple of different ways. The first is to do Common Sub-Expression Elimination (CSE). In this approach, an expression is said to be "available" at a program point if it was computed on all paths to that point, and none of its arguments have been modified since the last computation. For example, consider the pseudo code given in the following Pseudo Code Example I:

Pseudo Code Example I

```
if (argc > 0)
{
    p = winrt_ptr_cast(a); // Occurrence 1
}
else
{
```

```
        p = winrt_ptr_cast(a); // Occurrence 2
    }
    q = winrt_ptr_cast(a); // Occurrence 3
```

In the above example, there are three occurrences of an expression. The expression is said to be available at occurrence 3 and hence is a candidate for being eliminated. The CSE optimization stores the result of the computation into a temporary variable, and uses the value stored in the temporary variable for each occurrence that can be eliminated, as shown in the following Pseudo Code Example II:

Pseudo Code Example II

```
if (argc > 0)
{
    p = winrt_ptr_cast(a); // Occurrence 1
    temp = p;
}
else
{
    p = winrt_ptr_cast(a); // Occurrence 2
    temp = p;
}
q = temp; // Occurrence 3 eliminated
```

The above Example II shows how the CSE algorithm transforms the code in Example I.

A second approach for redundancy elimination is Partial Redundancy Elimination (PRE). Whereas CSE is able to eliminate fully redundant expression occurrences, PRE is a more general algorithm that can even eliminate so called "partial" redundancies. Both of the optimizations attempt to reduce the number of expression evaluations that are performed on any dynamic path through the program. The following Pseudo Code Example III illustrates PRE:

Pseudo Code Example III

```
if (argc > 0)
{
    p = winrt_ptr_cast(a); // Occurrence 1
}
else
{
    ...;
}
q = winrt_ptr_cast(a); // Occurrence 2
```

In Example III above, there are two dynamic paths from the start to the end of the code snippet. On one path, there are two evaluations of the expression, while on the other path, there is one evaluation of the expression. Expression occurrence 2 is said to be "partially redundant". PRE optimizes this code snippet as shown in the following Pseudo Code Example IV:

Pseudo Code Example IV

```
if (argc > 0)
{
    p = winrt_ptr_cast(a); // Occurrence 1
    temp = p;
```

```
}
else
{
    ...;
    temp = winrt_ptr_cast(a); // Inserted Occurrence
}
q = temp; // Occurrence 2 eliminated
```

In Example IV above, a new occurrence of the expression has been inserted in the "else" branch, which makes the partially redundant occurrence 2 fully redundant, and a candidate for elimination. Note that in the optimized program given in Example IV, both dynamic paths have only one evaluation of the expression.

One embodiment uses PRE because it is more general than CSE, in the sense that PRE handles all of the cases that CSE does, plus some additional cases. PRE also has the advantage of performing Loop Invariant Code Motion (LICM) automatically. If CSE is used, then LICM is implemented separately.

One embodiment is directed to an inter-procedural PRE method that is based on inter-procedural value numbering. Another embodiment is directed to an intra-procedural PRE algorithm, which is a simplified version of the inter-procedural method. The inter-procedural PRE method involves different components, each of which computes information that is used in performing the optimization.

One embodiment uses whole program analysis to detect redundant calls to cast helper functions within and across procedures and eliminate them. In one embodiment, if one cast function call makes another redundant, meaning that it computes the same result, then the result of the first cast function call is stored into a temporary variable, and the value stored in the temporary variable is used to eliminate the second, redundant cast call. There are several algorithms that have been proposed for partial redundancy elimination (PRE) within a function (i.e., intra-procedural), but embodiments disclosed herein use an inter-procedural algorithm that detects and eliminates redundancies both within and across functions (i.e., inter-procedural). One embodiment is directed to a method for inter-procedural partial redundancy elimination for cast function calls.

The analysis to detect redundancy according to one embodiment is completely automatic and does not use any annotations or information from the user. One embodiment performs a whole program analysis that includes three distinct components that work in conjunction to produce a final solution. The first component is a value propagation component that detects which object/interface reference pointer values are equivalent across procedures. The second component computes the partial availability of cast function call results across procedures. The third component computes the partial anticipability of cast function call results across procedures. These different data-flow values are used to determine which cast functions calls are redundant, and the redundant calls are eliminated. Finally, the algorithm according to one embodiment determines which functions will allocate the temporary variables that are used to transfer the value from a non-redundant cast call-site (producer) to a redundant cast call-site (consumer).

Figure 3:
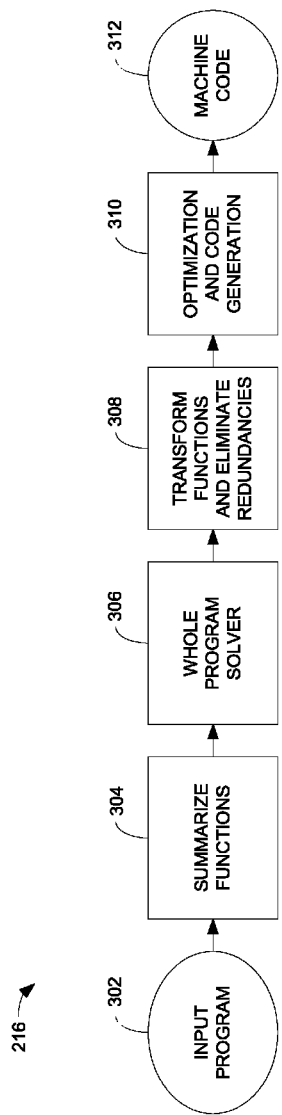
FIG. 3 is a diagram illustrating elements of a compiler back-end module for eliminating redundant calls according to one embodiment

FIG. 3 is a diagram illustrating elements of a compiler back-end module 216 for eliminating redundant calls according to one embodiment. Back-end 216 includes unit 304 for summarizing functions in input program 302, whole program solver unit 306, unit 308 for transforming functions and eliminating redundancies, and unit 310 for performing optimization functions and generating machine code 312. In one embodiment, input program 302 corresponds to intermediate language file 214 (FIG. 2) and machine code 312 corresponds to one of object code files 220-225 (FIG. 2).

Unit 304 analyzes each function in input program 302, computes a summary of relevant information for program 302, and stores the summary in a call graph. The call graph includes a plurality of nodes, with each node corresponding to a call function, and the nodes are interconnected by a plurality of directed edges. The relevant information includes function specific and call-site specific information. In one embodiment, the relevant information specifically includes: (1) reference object/interface pointers generated within a function, as well as the cast function calls in it; (2) an identification of which cast function calls are partially available before each call-site in the function; and (3) an identification of which cast function calls are partially anticipable after each call-site in the function.

Unit 304 identifies which expression occurrences are equivalent. In one embodiment, this is done by an interprocedural "value numbering" analysis. This analysis identifies which expressions are identical across procedures by taking into account value flow from one procedure to another through procedure arguments and return values. The main data structure that is used for value numbering is called AIPTagInfo, which is an abbreviation for Abstract Interface Pointer Tag Information. The AIPTagInfo data structure assigns each expression occurrence an integer Id called a Tag. It is this data structure that assigns each expression occurrence with a unique tag and identifies when two distinct expressions are equivalent by assigning them the same tag value. The tag values may be thought of as "value numbers" in the traditional compiler optimization sense. In one embodiment, "symbolic" type tag values are assigned to represent unknown formal parameter values, as well as call-site return values, when summarizing a procedure. These "symbolic" tags are eventually resolved into "concrete" tags by unit 306, which does the actual propagation of call-site arguments to procedure entries, and in the reverse direction, from return statements to call-site return values.

An expression is said to be "partially available" at a program point if it is available (was computed previously) along at least one path to the given point. When functions are summarized, unit 304 also constructs a partial availability summary for each expression tag. These being integers, the summaries are represented as sparse bit-vectors. An expression is said to be "partially anticipable" at a program point if it is anticipable (is re-computed later) along at least one path away from the given point. When functions are summarized, unit 304 also constructs a partial anticipability summary for each expression tag. These being integers, the summaries are represented as sparse bit-vectors.

Unit 306 propagates the summary information inter-procedurally to compute data-flow values for each function and call-site in the program. These data-flow values are used by unit 308 to determine which cast calls are redundant.

Each occurrence of an expression is a call instruction and hence can be associated with a call-site ID. Once the unit 306 has completed solving the value numbering, partial availability, and partial anticipability problems, unit 306 constructs a map (e.g., a call graph) between concrete expression tags (i.e., Abstract Interface Pointer tags that do not reference any symbolic tags) and sets of the original tags generated during the summary computation. This map is used in one embodiment because the partial availability and partial anticipability solutions are computed in terms of the original tags.

Using the mapping generated by unit 306, unit 308 computes the following two predicates for each expression call-site (corresponding to a call to the winrt_ptr_cast helper function): (1) useQI—this predicate means that the corresponding expression occurrence is redundant and can be replaced by a use of the value stored in the temporary variable for the expression; and (2) saveQI—this predicate means that the result of the corresponding expression evaluation (i.e., the call instruction return value) should be saved into the temporary variable for use in eliminating one or more other expression occurrences.

Unit 308 determines when an expression occurrence is partially redundant and a candidate for elimination. Once it has been determined which cast calls are redundant, unit 308 computes which functions should allocate the temporary variables used to transfer redundant values from a producer cast to a consumer cast. It is possible for an expression occurrence in one procedure, say "foo", to make another occurrence in a callee procedure, say "bar", redundant. In such cases, unit 308 transforms the program so as to store the cast result into a temporary buffer allocated on the stack in "foo", and ensures that this buffer is passed as an argument to function "bar", where the value is retrieved from the buffer and used to eliminate the redundant expression occurrence. Unit 308 thus determines which procedures are to allocate a temporary buffer on their stack to communicate the cast result values, and to which call-sites this buffer will be added as an extra argument.

For each call-site to a user defined function, unit 308 determines whether to append the temporary variable for an expression to the actual argument list for the purpose of using the value stored in the temporary variable to eliminate a redundant expression occurrence in a callee procedure. This predicate is termed "insertQI", and is computed for each call-site to a user-defined function. As with the above two predicates, the computation of the "insertQI" predicate uses the expression tag mapping and the partial availability/anticipability dataflow solutions.

Finally, during a code generation pass, unit 310 rewrites the functions to store each redundant value at each producer cast call into the right temporary variable, deletes each redundant cast call, and replaces the use of its result with the value in the temporary variable. Unit 310 also inserts code for passing the temporary variable as an argument to callee functions where the value is required.

In one embodiment, back-end 216 performs the above-described redundancy elimination method during a Link-Time Code Generation (LTCG) compiling operation, and the method involves three phases (e.g., during a bottom-up pass, after the bottom-up pass but before a code generation pass, and during the code generation pass) during the LTCG, as shown in the following Pseudo Code Example V:

Pseudo Code Example V

```
// This is run during the bottom-up pass.
void SummarizeFunctionInBottomUpPass(PFUNC function)
{
    BuildValueNumberSummary( );
    BuildPAVAILSummary( );
    BuildPANTSummary( );
    StorePrePassSummariesInCallGraph( );
}
// This is run after the bottom-up pass.
void RunAfterBottomUpPass( )
{
```

-continued

```
CreateCallGraphPass( );
AllocateAndRunValueNumberingSolver( );
AllocateAndRunPAVAILSolver( );
AllocateAndRunPANTSolverSolver( );
AllocateAndRunBufferPlacementSolver( );
FOREACH_CALLGRAPH_NODE(callNode)
{
    ComputeCallSitePredicates(callNode);
    if (NeedToTransform(callNode))
    {
        StoreCodeGenSummary(callNode);
    }
}
}
// This is run during code-gen pass to transform
// the function.
void OptimizeFunction(PFUNC function)
{
    if (NeedToOptimize(function))
    {
        BuildValueNumberSummary( );
        BuildPAVAILSummary( );
        BuildPANTSummary( );
        FOREACH_OPTIMIZED_EXPRESSION_TAG(tag)
        {
            AllocateTemporaryForExpressionTag(function, tag);
            ReWriteExpressionOccurrences(function, tag);
            InsertExpressionOccurrencesAtCalls(function, tag);
            InsertExpressionOccurrencesAtEdges(function, tag);
        }
    }
}
```

The method for intra-procedural PRE according to one embodiment is similar to the inter-procedural PRE method given in Example V above, and reuses much of the code for the inter-procedural version. One difference is that symbolic tags are not used for the intra-procedural PRE since cross-procedure information is not available. Pseudo-code for the intra-procedural PRE is given in the following Pseudo Code Example VI:

Pseudo Code Example VI

```
// This is run during code-gen pass to transform
// the function for a non-LTCG compile.
void OptimizeFunctionNonLtcg(PFUNC function)
{
    if (NeedToOptimize(function))
    {
        BuildValueNumberSummary( );
        BuildPAVAILSummary( );
        BuildPANTSummary( );
        ComputeCallSitePredicates(callNode);
        FOREACH_OPTIMIZED_EXPRESSION_TAG(tag)
        {
            AllocateTemporaryForExpressionTag(function, tag);
            ReWriteExpressionOccurrences(function, tag);
            InsertExpressionOccurrencesAtEdges(function, tag);
        }
    }
}
```

Figure 4:
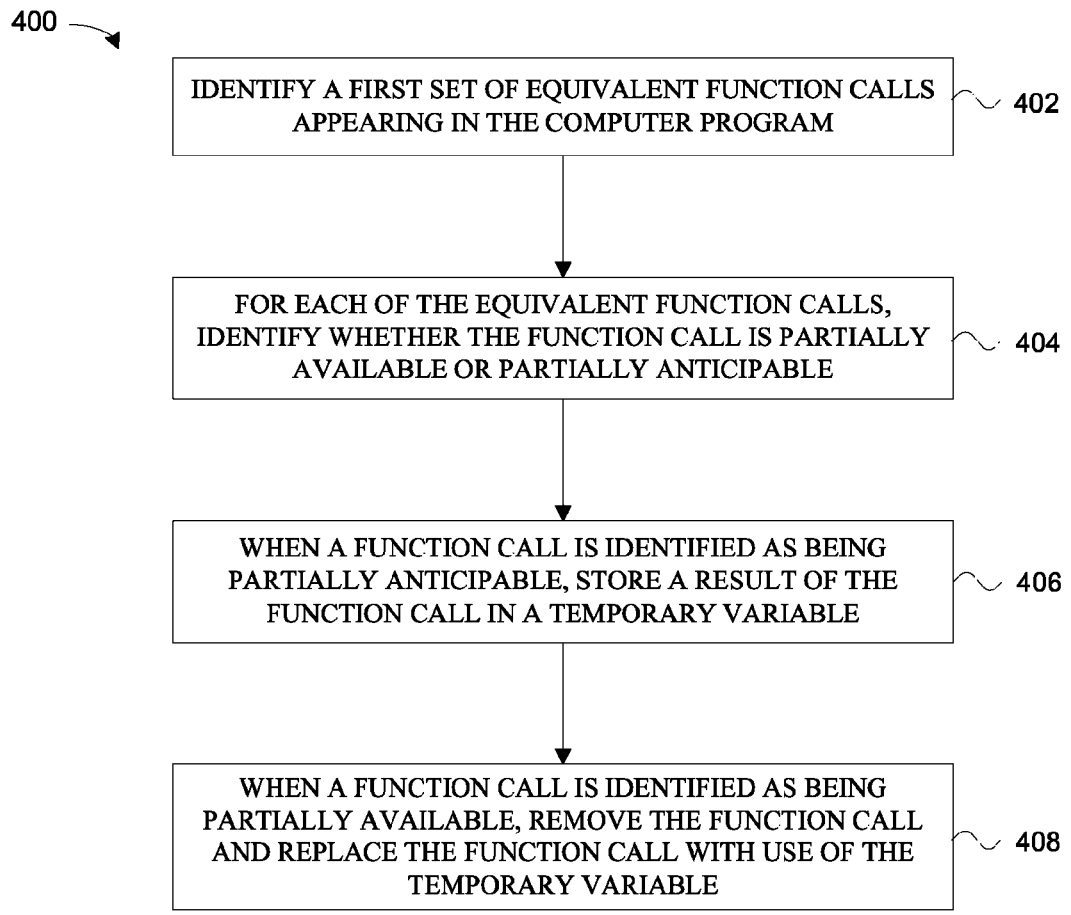
FIG. 4 is a flow diagram illustrating a computer-implemented method for removing redundant function calls in a computer program.

FIG. 4 is a flow diagram illustrating a computer-implemented method 400 for removing redundant function calls in a computer program. At 402, a first set of equivalent function calls appearing in the computer program is identified. In one embodiment, an inter-procedural analysis of the computer program is performed to identify the set of equivalent function calls. In one embodiment, a value numbering analysis is performed to identify the first set of equivalent function calls. In one embodiment, an inter-procedural analysis is performed to identify equivalent function calls within procedures and across procedures in the computer program, wherein the equivalent function calls have been automatically inserted into the computer program by a compiler front-end.

At 404, for each of the equivalent function calls, the method identifies whether the function call is partially available or partially anticipable. In one embodiment, an inter-procedural analysis of the computer program is performed to identify whether each function call is partially available or partially anticipable. At 406, when a function call is identified as being partially anticipable, a result of the function call is stored in a temporary variable. At 408, when a function call is identified as being partially available, the function call is removed and replaced with use of the temporary variable.

In one embodiment, method 400 is performed by at least one processor. In one embodiment of method 400, a function call is identified as partially available if the function call was computed previously along at least one path to the given the function call, and the function call is identified as partially anticipable if the function call is re-computed later along at least one path away from the function call. Method 400 according to one embodiment is performed on cast helper function calls in the computer program, wherein the cast helper function calls are automatically inserted into the computer program by a compiler front-end, and the method 400 is performed by a compiler back-end.

Method 400 according to one embodiment further includes generating a call graph for the computer program, and storing summary information in the call graph, wherein the summary information identifies whether function calls are partially available or partially anticipable. In one embodiment, method 400 further includes identifying non-redundant call sites to allocate temporary variables and produce values to store in the temporary variables, identifying redundant call sites that consume the values stored in the temporary variables, and passing information regarding the temporary variables as a call function argument to at least one of the redundant call sites.

Although some embodiments are directed to eliminating redundant functions calls related to the COM QueryInterface method, the techniques disclosed herein are applicable to any kind of function, provided redundant ones can be eliminated. Examples of these are computationally "expensive" math functions like sin, cos, log, etc. The techniques disclosed herein are applicable not only to function calls, but to any kind of expression that includes arithmetic operations, like "*", "/", etc. From the perspective of the optimization, as long as these functions/expressions produce the same result for the same input arguments, redundant occurrences can be eliminated.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof

What is claimed is:

1. A computer-implemented method for removing redundant function calls in a computer program, comprising:
   identifying a first set of equivalent function calls appearing in the computer program;
   for each of the equivalent function calls, identifying whether the function call is partially available or partially anticipable, wherein a function call is identified as partially available if the function call was computed previously along at least one path to the function call, wherein a function call is identified as partially anticipable if the function call is re-computed later along at least one path away from the function call;

when a function call is identified as being partially anticipable, storing a result of the function call in a temporary variable;

when a function call is identified as being partially available, removing the function call and replacing the function call with use of the temporary variable; and wherein the method is performed by at least one processor.

2. The computer-implemented method of claim 1, and further comprising:
performing an inter-procedural analysis of the computer program to identify the set of equivalent function calls.

3. The computer-implemented method of claim 1, and further comprising:
performing an inter-procedural analysis of the computer program to identify whether each function call is partially available or partially anticipable.

4. The computer-implemented method of claim 1, wherein the method is performed on cast helper function calls in the computer program.

5. The computer-implemented method of claim 4, wherein the cast helper function calls are automatically inserted into the computer program by a compiler front-end.

6. The computer-implemented method of claim 1, wherein the method is performed by a compiler back-end.

7. The computer-implemented method of claim 1, and further comprising:
performing a value numbering analysis to identify the first set of equivalent function calls.

8. The computer-implemented method of claim 1, and further comprising:
generating a call graph for the computer program;
storing summary information in the call graph, wherein the summary information identifies whether function calls are partially available or partially anticipable.

9. The computer-implemented method of claim 1, and further comprising:
identifying non-redundant call sites to allocate temporary variables and produce values to store in the temporary variables.

10. The computer-implemented method of claim 9, and further comprising:
identifying redundant call sites that consume the values stored in the temporary variables.

11. The computer-implemented method of claim 10, and further comprising:
passing information regarding the temporary variables as a call function argument to at least one of the redundant call sites.

12. A computer-readable storage medium storing computer-executable instructions that when executed by at least one processor cause the at least one processor to perform a method of removing redundant function calls in a computer program, the method comprising: identifying equivalent function calls appearing in the computer program; for each of the equivalent function calls, identifying whether the function call is partially available or partially anticipable, wherein a function call is identified as partially anticipable if the function call is re-computed later along at least one path away from the function call, wherein a function call is identified as partially available if the function call was computed previously along at least one path to the given the function call;

when a function call is identified as being partially anticipable, storing a result of the function call in a temporary variable; and when a function call is identified as being partially available, removing the function call and replacing the function call with use of the temporary variable; and wherein the computer-readable storage medium does not include a propagation medium.

13. The computer-readable storage medium of claim 12, wherein the method further comprises:
performing an inter-procedural analysis of the computer program to identify the equivalent function calls.

14. The computer-readable storage medium of claim 12, wherein the method further comprises:
performing an inter-procedural analysis of the computer program to identify whether each function call is partially available or partially anticipable.

15. The computer-readable storage medium of claim 12, wherein the method is performed on cast helper function calls in the computer program.

16. The computer-readable storage medium of claim 15, wherein the cast helper function calls are automatically inserted into the computer program by a compiler front-end, and wherein the method is performed by a compiler back-end.

17. The computer-readable storage medium of claim 12, wherein the method further comprises:
performing a value numbering analysis to identify the first set of equivalent function calls.

18. A computer-implemented method for removing redundant function calls in a computer program, comprising:
performing an inter-procedural analysis to identify equivalent function calls within procedures and across procedures in the computer program, wherein the equivalent function calls have been automatically inserted into the computer program by a compiler front-end;

for each of the equivalent function calls, identifying whether the function call is partially available or partially anticipable, wherein a function call is identified as partially available if the function call was computed previously along at least one path to the function call, and the function call is identified as partially anticipable if the function call is re-computed later along at least one path away from the function call;

when a function call is identified as being partially anticipable, storing a result of the function call in a temporary variable;

when a function call is identified as being partially available, removing the function call and replacing the function call with use of the temporary variable; and wherein the method is performed by at least one processor.

* * * * *